Figure 6:
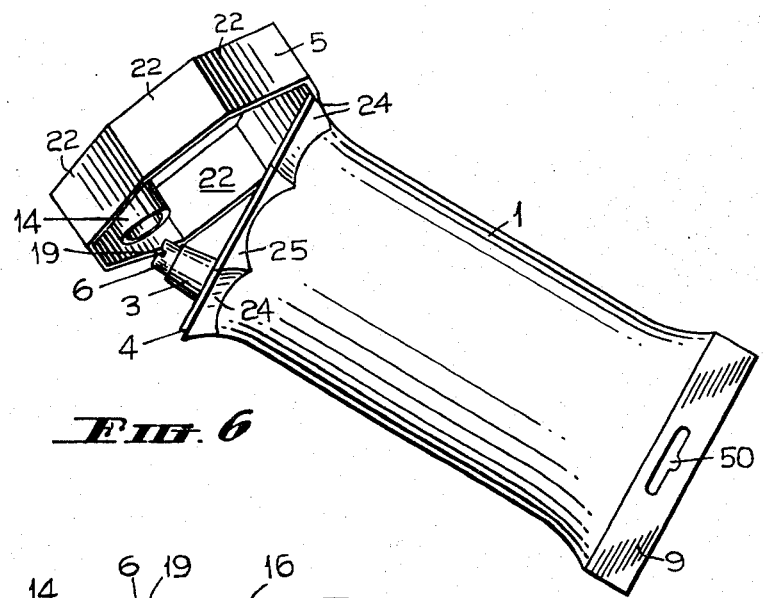

United States Patent [19]

Scammell

[11] Patent Number: 4,470,521

[45] Date of Patent: Sep. 11, 1984

[54] DISPENSER FOR VISCOUS OR, SEMI-VISCOUS MATERIALS

[76] Inventor: John F. Scammell, 7 The Common, Beaumont, S.A. 5066, Australia

[21] Appl. No.: 285,119

[22] PCT Filed: Nov. 14, 1980

[86] PCT No.: PCT/AU80/00087

§ 371 Date: Jul. 20, 1981

§ 102(e) Date: Jul. 20, 1981

[87] PCT Pub. No.: WO81/01544

PCT Pub. Date: Jun. 11, 1981

[30] Foreign Application Priority Data

Nov. 30, 1979 [AU] Australia .............................. PE1553

[51] Int. Cl.³ .......................... B65D 5/72; B65D 35/08
[52] U.S. Cl. .................................... 222/107; 222/173;
222/543; 222/556
[58] Field of Search ............... 222/107, 543, 545, 556,
222/215, 562, 92, 206, 575, 544, 546, 498, 212,
173; 220/337, 339, 375

[56] References Cited

U.S. PATENT DOCUMENTS 3,595,441  7/1971  Grojean ............................. 222/107
3,710,989  1/1973  Armour ............................. 222/562
4,232,721 11/1980  Martin et al. .................... 222/107 X
4,261,482  4/1981  Yamada et al. ................... 222/107 X Primary Examiner—Joseph J. Rolla
Attorney, Agent, or Firm—Robert E. Burns; Emmanuel J. Lobato; Bruce L. Adams

[57] ABSTRACT

A paste dispenser having a body (1) of plastics with an expanded head (8) having a cap (5) formed integrally therewith by a hinge adapted to engage the head part of the tube with a snap fit, the tube having a nozzle (3) for discharge of the contents, closed by a hollow member (14) in the cap, the cap and head a dimension in width some what similar to the crimped end (9) of the tube being moulded by using in the dies at least one channel (37) to give longitudinal flow of the plastics material during moulding but latterally spread from the channels to enable a long controlled thin wall to be formed.

13 Claims, 11 Drawing Figures

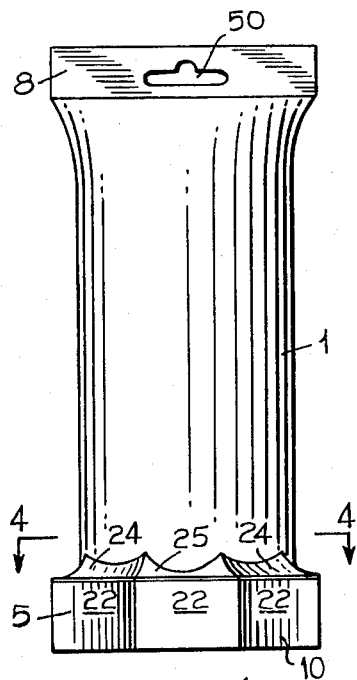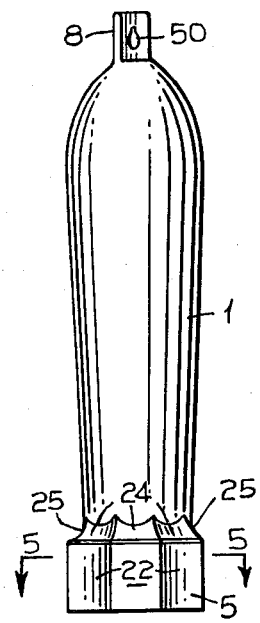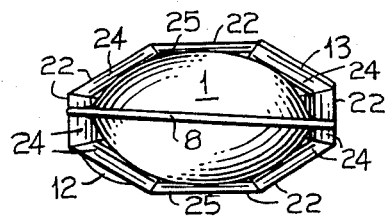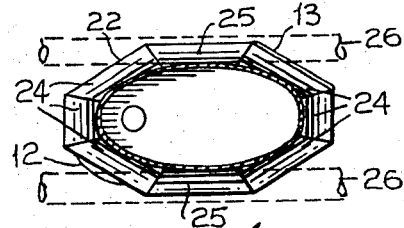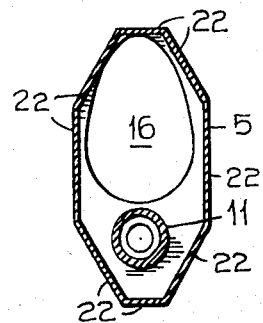

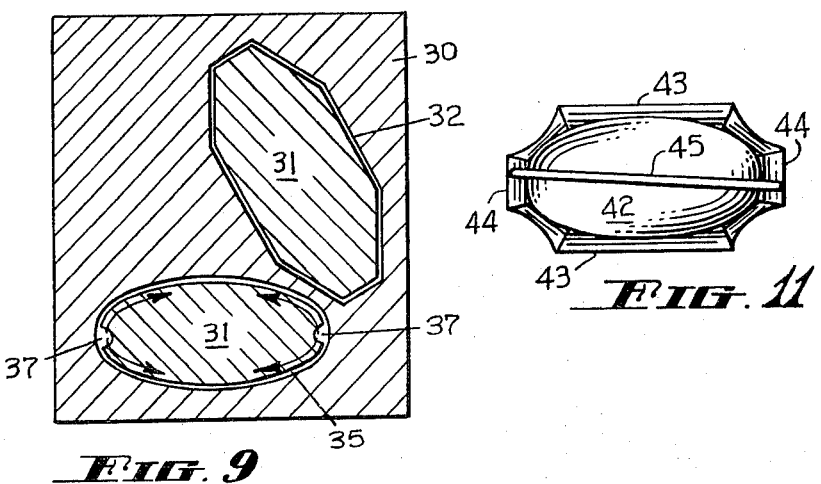
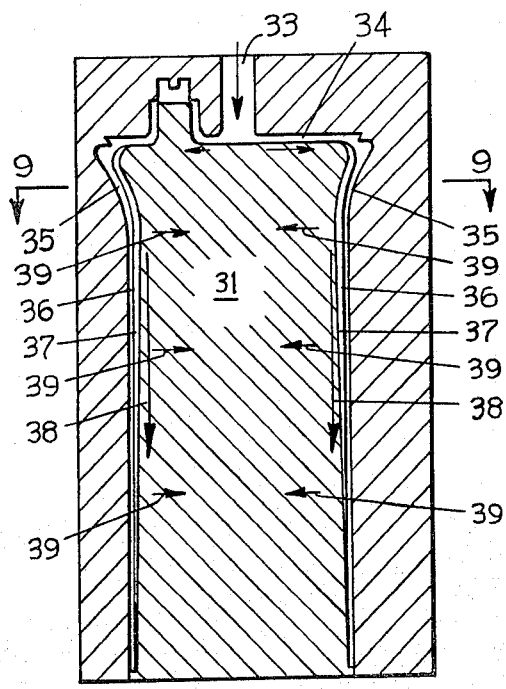

DISPENSER FOR VISCOUS OR, SEMI-VISCOUS MATERIALS

This invention relates to an improved form of paste dispenser and in particular it relates to containers of the type generally used for toothpaste or the like which comprise a distortable tubular elongated body having one end closed by a wall in which is a discharge aperture or nozzle which in some cases has to be pierced after removing a protective cap when it is desired to eject the contents of the container.

With the present type of device it is customary to form the container from a suitable mouldable or extrudable material, either metal or plastics, and to have at one end of the container a closure with a projecting screw-threaded mozzle, preferably with a thin pierceable sealing membrane across it, and to then screw on to the end of the threaded nozzle a cap which must be replaced each time that the tube is used, the tube being filled from the other end with the required amount of toothpaste, or other viscous or semi-viscous material, and being then sealed at that end by bending and crimping or welding the end of the tube, or by any other means, such a tube being shown for instance in the specification of United States Letters Patent to Yamada et al No. 4,261,482.

Certain problems exist in the forming of tubes in this way, particularly when plastics are involved, and it is usually necessary to form that end of the tube which contains the opening or discharge section, generally referred to herein as the head, separately from the tubular extension which holds the content and to then weld the tubular extension to the more solidly moulded head.

Apart from the difficulty of forming such tubes there are certain packaging difficulties in that one end of the tube, as well as the main extension of the tube, is of cylindrical form and because the end through which the contents are filled must be flattened to turn over the extreme end portion to effect a seal, or to weld the extreme end portion to seal the end of the tube, that end of the tube has considerably greater extension than the cylindrical part of the tube so that the space required during packaging at one end of the filled tube differs considerably to the space required at the other end of the filled tube. This effect is shown in the above referred to United States patent specification.

There is also the problem that with a removable cap there is the danger of the cap being misplaced, and while it has been proposed heretofore to form the discharge end of such tubes with a hinged cap or closure member, the protection of the contents has not necessarily been effective because the contents were not protected once the seal was broken and particularly if the cap was not replaced. See for instance the specification of United States Letters Patent to Robert M. Grosjean No. 3,595,441 and the specification of United States Letters Patent of Jerry D. Martin No. 4,232,721.

The object of the present invention is to provide a method of forming such a container and also to provide an improved container of this type which will be simpler to manufacture and to use and in which the content will be protected effectively against contamination during transit, or prior to use, and will be readily protectable after a seal or closure has been broken.

A further object is to achieve a shape which will be better for packaging than the present devices.

A still further object is to form the entire dispenser in a single moulding operation, preferably including the closure means for the discharge end of the tube as well as the sealing which protect the content during transport and storage to give maximum consumer protection.

The packaging improvement is achieved by having the head of the tube, that is the end from which discharge takes place, and the cap of a dimension such that approximately the same width of the tube exists at this end and the other end when it is sealed by closing the end of the tube after filling and sealing the closure, but for packaging convenience it is preferred to have the plane of the seal slightly angled in relation to the head at the other end, the head preferably being of elongated oval or octagonal shape defined herein by the tube having a major axis in cross-section with the tube generally matching the head forming part, the head forming part being generally provided with register channels on two opposite sides of it in a position such that the tube can be held and moved between guide members which engage these register channels and which will effectively align the tube major axis during processing such as filling and subsequent sealing of the filling end of the tube.

A further feature of the tube according to this invention is to so arrange the shape of the tube that the dies which consist of an inner and an outer die are given the necessary taper to allow the inner die to be withdrawn after moulding of the tube, but to have the wall thickness and shape of the tube such that it can be withdrawn from the head end by a permissible distortion of the material forming the body of the tube during such withdrawal from the outer die, this being achieved by controlling the shape and thickness of the extending part of the tube to the open end.

The head is moulded to extend outwardly somewhat from the body part of the tube at least on the major axis and is provided with a discharge spout which can normally be sealed but fracturable by twisting or like action to open the end of the tube, but this portion is protected by a cap hinged to the head along one edge so that it can be locked down to form a seal on that end of the tube but can readily be snapped open to expose the discharge nozzle when it is required to eject the contents, but repositionable to again seal the end when the required amount has been removed from the tube.

Thus the invention comprises a paste dispenser having a tubular body elongated in cross-section to have a major axis, a head and a hinged cap on said head formed as an integral unit by a moulding operation and also elongated in the same general plane, said tubular body having a filling end adapted to be closed by flattening the tubular body and sealing to form a transverse closure generally on the said major axis an integral end wall closing the head, a nozzle formed in the end wall to communicating through the end wall with the inside of the tubular body, there being closure means on the cap for the nozzle.

Figure 8:
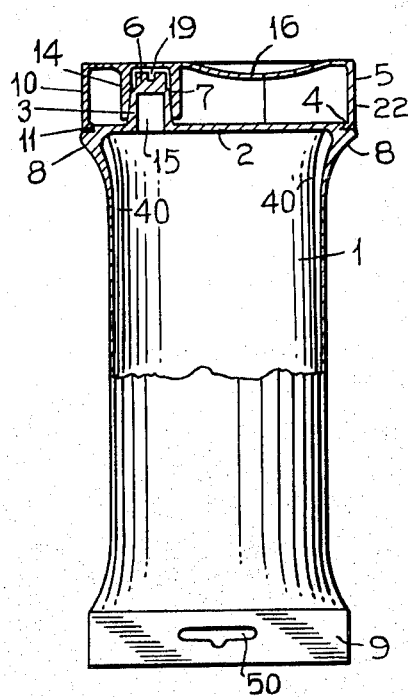
Figure 7:
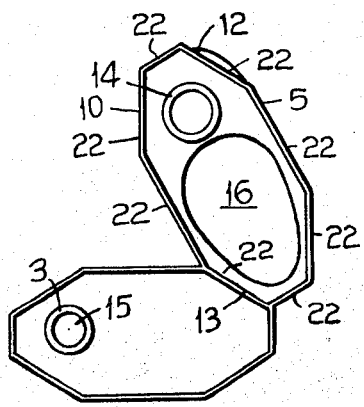

To enable the invention to be fully appreciated, a preferred embodiment will now be described with reference to the accompanying drawings in which:

FIG. 1 is a front elevation of such a dispenser standing on the cap as it would for display purposes, FIG. 2 is a side elevation of same, FIG. 3 is an end view of same from the filling end, FIG. 4 is a transverse section of same on line 4—4 of FIG. 1, FIG. 5 is a transverse section of same as on line 5—5 of FIG. 2, FIG. 6 is a front elevation with the cap partly open to allow the seal to be broken to discharge some of the contents, FIG. 7 is an end view with the cap swung back fully, FIG. 8 is a part-sectional side elevation with the cap in its closed sealing position with the discharge nozzle still sealed, FIGS. 9 and 10 are somewhat schematic views showing the dies used to mould the dispenser, FIG. 9 being a section of the dies on line 9—9 of FIG. 10, FIG. 10 being a transverse section of the dies to show particularly the channels which allow ready injection of the material of the dispenser to ensure an effective one-shot moulding and to allow relatively long extension of the body of the dispenser to be achieved.

FIG. 11 shows how the cap and head of the tube can be varied in shape.

A device according to the drawings comprises a tubular body 1 formed of a suitable plastics, or similar distortable material which has its one end closed by a an end wall 2 and has on the end wall 2 a nozzle 3 of tapered shape with a decreasing dimension outwards. The end wall and adjacent part of the tubular body constitute what we term a head.

The end wall 2 has an undercut ridge 4 around its perimeter portion to act as a click catch to hold the attached cap 5 in a closed, but releasable position as shown in FIG. 8.

The nozzle 3 extends from the end wall 2 so that the nozzle can be cut to allow the contents of the tube to be ejected, or as shown in the drawing it can be provided with a plug 6 which can be twisted to fracture at the area 7 to unseal the end of the nozzle 3.

In the form shown in the drawings, the tubular body is of oval shape with an expanded head 8 arranged to be dimensionally of similar width to the width of a transverse closure 9 at the sealed end of the tubular body, but the transverse closure 9 is slightly angled as shown in FIG. 3 to allow the tubes to be effectively packed in a contiguous relationship for transport and storage. The edge of the perimeter wall 10 of the cap 5 is inwardly shaped to form a ridge 11 which co-acts with the undercut ridge 4 of the end wall 2 to mate therewith and hold the cap in a closed position during transit and storage but allowing it to be flicked open by pressure on the small finger grip 12 positioned on the cap on the opposite side to the hinge 13 which joins the cap 5 to the head 8.

The cap is adapted to cover the end of the tube adjacent the end wall 2, that is the head, and encloses the nozzle 3 and has within it a projecting hollow sealing member 14 of a shape generally complementary to the nozzle 3 so that when the cap 5 is closed on to the end of the tube, the inwardly projecting sealing member 14 fits over the nozzle 3 to sealingly close the opening 15 in the end wall 2 which communicates with the nozzle 3 but also covers the region outside of and surrounding the nozzle 3 to protect the nozzle 3 against contamination. The cap 5 thus forms a protective member over the whole of the discharge end of the tube and protects this end, and the cap has an outer surface shaped to allow the tube to stand in an upright position on the cap. The cap outer surface can be provided with a recessed portion 16 to enable the tube to stand upright even on somewhat irregular surfaces.

When it is desired to express some of the content of the tube through the nozzle 3, the cap 5 is swung back about its hinge 13 to clear the nozzle 3, and the nozzle 3 can then have its end opened by cutting it by means of scissors, or the plug 6 which is joined to the end of the nozzle 3 by a thin wall 18 can be twisted by placing a blade into the recess 19 to shear at 7 to open the nozzle 3, whereupon, provided the cap 5 is swung back as shown in FIG. 6, some of the content can be squeezed from the tube through the nozzle 3. Repositioning of the cap 5 causes the inwardly projecting sealing member 14 of the cap 5 to engage over the nozzle 3 and effect a seal, the area around the nozzle being also protected by the cap 5 so that a double, hygienic closure results.

Such a tube 1 with the cap 5 moulded thereon can then be filled from the other end in a normal manner and sealed at that end by the transverse closure 9 as shown and it will be realised that the content of the tube will be maintained in a sealed condition until such time as the cap is opened and the hollow nozzle is unsealed, but immediately after a required amount has been ejected from the tube, the cap 5 can be swung back into position to seal the nozzle 3 against further flow to prevent drying out or contamination.

The cap 5 has its perimeter wall shaped to provide a series of flats 22, and the hinge 13 is formed between the cap 5 and the tube 1 along one of these flats, the finger grip 12 projecting from an opposite flat on the cap 5 to allow the cap 5 to be snapped open about the hinge 13.

It will be realised that, as the whole device can be formed from a single moulding, there will be no problem of loss of the sealing member 14 as is the case with loose screwed or push-on caps. Further, because of the construction the nozzle itself is protected by the sealing member 14 fitting over it during transit and storage so that the nozzle and the surrounding parts are hermetically sealed at that stage, and when the cap is swung back to uncover the nozzle to release the content, the nozzle is hygienically clean, and after ejection of some of the content, the cap again protects the nozzle and the surrounding area.

As the cap 5 and the head 8 of the tube 1 are defined to have a number of flats 22, lining up of the tubes during processing and packing is facilitated, and by having the cap 5 of elongated shape orientation is readily effected when filling or packing or the like. The tube is provided with curved fillers 24 and 25 which join the oval portion of the tube 1 to the head 8 of the tube, the curved fillers 25 serving to form guides for the tubes when moved along between rail 26 which can form part of a filling or labelling machine or for effecting packaging, such rails being indicated by dotted lines in FIG. 4.

The filled tubes 1 can be packed with the flats 22 of the caps 5 contiguous, thus allowing an assembly of such tubes to be wrapped in shrink-fit material to form a stable package which can be better handled in transport and storage and is less likely to suffer loss by stealing of individual tubes.

Referring now to the method of moulding the tube of this invention, referring to FIGS. 9 and 10, the outer die 30 is mated with an inner die 31 to form between them a cavity. The plastic material is caused to flow into the cavity through the feed channel 33 and spreads to the part 34 of the cavity which defines the end wall 2 which is part of the head 8, and flows thence to the part of the cavity which forms the tube body, flow taking place also to the cavity 32 which forms the cap 5. Flow takes place generally laterally into the section 34 of the cavity, and continues around the headforming part 35 of the cavity and continues down the part 36 of the cavity which forms the body of the tube. It will be appreciated that flow down that part of the cavity which forms the elongated tube body tends to be restricted because of the thinness of the wall being formed, and this invention solves the problem by having at least a longitudinally placed distributor channel or channels such as 37 which allow flow longitudinally through them in the direction shown by the arrows 38 because of the greater cross-sectional area of the channels and reduced resistance to flow of the plastics material, but the channels act as distributors to give lateral flow of the plastics in the general direction shown by the arrows 39 and result in ribs 40 in the finished tube at the major axis of the body. As the length of path laterally between the distributor channels 37 is much shorter than the length of the tubular body itself, it is possible by appropriate proportioning to form relatively long thin-walled tubes by plastics injection, making it possible to form the tubes in a one piece moulding, including the cap as an integral part of the tube, the joint between the body of the tube and the cap being formed by the integral hinge.

From the foregoing it will be realised that the invention proposes a novel system in which a collapsible tube of any suitable form is completely formed in a single injection including an integrally moulded plastic cap for projection of the discharge opening.

It will be realised that the cap itself is so formed that it is in a sealed mode when the container is being filled, the cap having interengaging circular projections with sloping walls which engage a corresponding projection with a click-fit when the pressure is applied, the cap having integrally formed hinging means so that it is retained in position at all times.

Thus according to this system the tube can be filled with the material which it has to dispense, the cap being in a position where it protects and aids to seal the tube, and the unit is then ready for transport and storage after the filling end of the tube is closed.

The cross-sectional shape of the tube body can be varied according to requirements and, for instance, in FIG. 11 is shown how a relatively flat tube can be formed using an oval tubular body 42 with long indexing sides 43 to the discharge end of the body and cap and with fillers 49 increasing the transverse dimension of the body to approximately that of the transverse closure 45.

The transverse closure can have a hanging slot 50 as shown in the illustration.

The claims defining the invention are as follows:

1. An improved paste dispenser comprising: a tubular body elongated in cross-section on a major axis, a cap hinged to the said body movable between open and closed positions, both the cap and tubular body being formed as a single interconnected unit by a moulding operation, said cap having an outer surface shaped to enable the paste dispenser to rest thereon and be supported thereby when the cap is in the closed position so as to permit the paste dispenser to be stored in an upright position, said tubular body having a filling end closeable by flattening the tubular body substantially on said major axis and sealable to form a transverse closure, the said tubular body having at the end opposite to the said closure a head expanded at least in the direction of the said major axis to have an extension substantially the same as that of the said transverse closure, a wall extending across the said head to seal the head end of the said tube, a nozzle formed on the said wall with an opening communicating through the said wall with the inside of the said body, closure means on the said cap for closing the said nozzle when the cap is in the closed position, and means on the said cap coacting with means on the said head to releasably hold the said cap in the closed position.

2. An improved paste dispenser according to claim 1 wherein the said tubular body has curved fillers extending from the external face of the body to the periphery of the head of the said tube.

3. An improved paste dispenser according to claim 1 wherein the head and the cap have a series of flats along their edge faces and are similarly shaped to be of elongated form, and the said head has fillers joined from the periphery of the head to the periphery of the body which is of oval cross-section somewhat smaller than the periphery of the head.

4. An improved paste dispenser according to claim 3 wherein the said fillers curve outwardly from the periphery of the said body.

5. An improved paste dispenser according to claim 1 wherein the said cap and the said expanded head of the tubular body have flat side faces, and said head and said cap being similarly shaped peripherally.

6. An improved paste dispenser according to claim 1 or 5 wherein the means on said cap coacting with the means on said head comprise interengageable ridges on the cap and head adjacent to their peripheries to hold the said cap to the said body with a snap-on fit.

7. An improved paste dispenser according to claim 5 wherein two of the said flats are positioned on opposite sides of the said head of the said body or cap and are parallel the one to the other to serve as register means to fix the orientation of the said dispenser during filling or other processing.

8. An improved paste dispenser according to claim 7 wherein the said transverse closure is angled slightly in relation to the said register means.

9. A paste dispenser comprising: a single piece in the shape of a tubular body having a major transverse dimension and a minor transverse dimension, an end wall extending across the cross section of said tubular body at one end portion thereof and having a major dimension oriented in the direction of and substantially equal to the major dimension of said tubular body cross section, a nozzle on said end wall for providing communication from inside said tubular body, a hinge cap hinged to said tubular body adjacent said end wall and positionable between a closed position sealingly covering said end wall to protect the region surrounding said nozzle and an open position clear of said end wall, said hinge cap having an outer surface shaped to enable the paste dispenser to rest thereon and be supported thereby when the hinge cap is in the closed position so as to permit the paste dispenser to be stored in an upright position, means for releasably holding said hinge cap in the position covering said end wall, a nozzle cap on said hinge cap positioned for closing said nozzle when said hinge cap is in the closed position covering said end wall and for parting from said nozzle to open said nozzle when said hinge cap is in the open position clear of said end wall, and a closed end portion opposite said end wall and tapering to a flat seam oriented substantially along the transverse major dimension of said tubular body and having a length substantially equal to the transverse major dimension of said end wall.

10. A paste dispenser according to claim 9, wherein said hinge cap has a pair of flat side faces on opposite sides thereof and oriented parallel to the major transverse dimension of said hinge cap when said hinge cap is positioned covering said end wall.

11. A paste dispenser according to claim 9, wherein said end wall has a periphery defined by straight segments and said tubular body has a generally oval cross section which tapers to the shape of said end wall periphery, said hinge cap has flat side portions and a cross section like the periphery of said end wall, and said hinge cap is oriented to coincide with the shape of said end wall when said hinge cap is positioned covering said end wall.

12. A paste dispenser according to claim 9, wherein said single piece having said nozzle is shaped to have a nozzle closure manually removable to open said nozzle.

13. A paste dispenser according to claim 12, wherein said hinge cap has a pair of flat side faces on opposite sides thereof and oriented parallel to the major transverse dimension of said hinge cap when said hinge cap is positioned covering said end wall.

* * * * *